United States Patent [19]

Carlton et al.

[11] Patent Number: 5,321,393
[45] Date of Patent: Jun. 14, 1994

[54] SPARE CARD CONNECTION AND SWITCHING CIRCUITRY FOR HIGH-SPEED TELECOMMUNICATIONS INTERFACES

[75] Inventors: Stephen C. Carlton; Paul A. Elias, both of Plano, Tex.

[73] Assignee: Alcatel Network Systems, Inc., Richardson, Tex.

[21] Appl. No.: 867,265

[22] Filed: Apr. 10, 1992

[51] Int. Cl.[5] .................... H04L 12/50; H04J 15/00; G06F 11/20
[52] U.S. Cl. .................. 340/825.01; 340/825.03; 340/825.16; 370/16; 371/8.1; 371/8.2
[58] Field of Search ............... 340/825.01, 825.02, 340/825.03, 825.79, 826, 827, 825.8, 825.16; 370/15, 16, 79; 379/2, 5, 273, 279; 333/101; 343/876; 359/135; 371/8.1, 8.2, 11.1, 11.2, 20.5

[56] References Cited

U.S. PATENT DOCUMENTS

| | | | |
|---|---|---|---|
| 3,694,775 | 9/1972 | Rogers | 333/101 |
| 4,451,708 | 5/1984 | Kemler et al. | 379/2 |
| 4,517,572 | 5/1985 | Dixon | 333/101 |
| 4,774,703 | 9/1988 | Force et al. | 371/8.2 |
| 5,229,990 | 7/1993 | Teraslinna | 340/825.8 |

FOREIGN PATENT DOCUMENTS 4-51723  2/1992  Japan ............... 340/825.01

OTHER PUBLICATIONS

GTE Automatic Electric Journal, "No. 2 EAX, 2A to 2B Processor Conversion", pp. 164–168, Sep.–Oct. 1981, Donato et al.

*Primary Examiner*—Sandra L. O'Shea
*Assistant Examiner*—Mark H. Rinehart
*Attorney, Agent, or Firm*—Baker & Botts

[57] ABSTRACT

In a plurality of working interface circuits (12–19), each circuit has at least one transmitter (86) and at least one receiver (88). A spare interface circuit (35) has at least one transmitter (158) and at least one receiver (154). A switch circuit (21) is coupled to the working interface circuits (12–19) and the spare interface circuit (35) and includes a plurality of switches (110–117; 109; 122, 138, 130, 150) which are operable to create a selected one of at least two data paths. A first of these data paths may be selectively formed from a selected one of the working interface circuits (12–19) to the spare interface circuit (35) to monitor the operation of the selected one of the working interface circuits (12–19) without affecting any communications signal transmitted by that working interface circuit. Another data path may be selectively established from a malfunctioning one of the working interface circuits (12–19) to the spare interface circuit (35). For substituting at least a portion of the spare interface circuit (35) for a like portion of malfunctioning one of the working interface circuits (12–19). In a preferred embodiment, a third data path may be selectively established from the spare interface circuit, through the switch circuit and back to the spare interface circuit to monitor the operation of the spare circuit (21).

10 Claims, 5 Drawing Sheets

SPARE CARD CONNECTION AND SWITCHING CIRCUITRY FOR HIGH-SPEED TELECOMMUNICATIONS INTERFACES

TECHNICAL FIELD OF THE INVENTION

This invention relates in general to telecommunication circuits, and more particularly to a spare card connection and card monitoring circuit for high-speed telecommunication interface circuits.

BACKGROUND OF THE INVENTION

Transmission systems that take in DS3 of STS (Synchronous Optical Network Transport Signal) signals in large numbers often employ a 1-for-n or m-for-n protection scheme whereby a number of interface cards (n) are protected by one or m spare interface cards. The incoming signals and outgoing signals can be routed to the spare card in a variety of ways. The most common is to pass the signal first to a switch card, which can route the signals either to the working cards or to the spare cards. One problem with this approach is that if the switch card is removed from the system, the paths to both the working and the spare card are broken and the signals are lost. Some systems employ special connectors which, when the card is removed, connect the signal paths. Unfortunately, these connectors have proven unreliable in service.

Another problem is that the output circuits on the working cards cannot be tested without affecting the output signals. If an incoming signal fails outside the system, the system of course cannot protect against it. However, conventional testing methods do not know whether the failure is external until they switch the signal to the spare card to try to protect it. This switching event may affect other signals. The performance of transmission systems is sometimes gauged by customers by the number of switches that the transmission systems make in changing in and out working interface cards. Conventional testing methods are undesirable because of the unnecessarily large number of switching events.

A need therefore exists for an ability to bridge onto a high-speed telecommunication signal to test it without affecting the signal, and to provide a monitoring and testing method which does not cause countable switching events in the working interface cards.

SUMMARY OF THE INVENTION

The present invention allows monitoring of the working cards from the spare card by allowing the spare card to "bridge on" to the signal received by any one of the working cards. According to one aspect of the invention, switching and monitoring circuitry for use in an electronic communications interface includes a plurality of working interface circuits each having at least one transmitter and at least one receiver. A spare interface circuit is provided which also has at least one transmitter and at least one receiver. A switch circuit is coupled to the working interface circuits and the spare interface circuit, and includes a plurality of switches operable to create a selected one of at least two different data paths. A first of these data paths is established from a selected one of the working interface circuits to the spare interface circuit, and monitors the operation of the selected one of the working interface circuits without affecting any communications signal that is transmitted by the selected working interface circuit. A second data path may be selectively established from a malfunctioning one of the working interface circuits to the spare interface circuit for substituting at least a portion of the spare interface circuit for a like portion of the malfunctioning one of the working interface circuits.

According to another aspect of the invention, the switching and monitoring circuitry establishes, instead of or in addition to the first data path described above, a data path from the spare interface circuit through the switch circuit and back to the spare interface circuit, such that the spare interface circuit may be used to monitor the operation of the switch circuit.

A principal technical advantage of the invention is that, with the signal flowing through the working interface card, the switch card can bridge onto the signal for the purpose of testing the signal without "hitting" it. The switch card itself may also be tested to find failures before the switch card is required for protection purposes. The present invention further allows the testing of the spare card while it is not being used. Thus, any of the working outputs may be monitored by the spare interface card. This allows all of the output circuits to be tested in a way not possible with other protection circuits.

BRIEF DESCRIPTION OF THE DRAWINGS

Further aspects of the invention and their advantages will be discerned by referring to the following detailed description, when taken in conjunction with the drawings, in which.

DETAILED DESCRIPTION OF THE INVENTION

The present invention and its advantages are best understood by referring to FIGS. 1–3e of the drawings, like numerals being used for like and corresponding parts of the various drawings.

Figure 1:
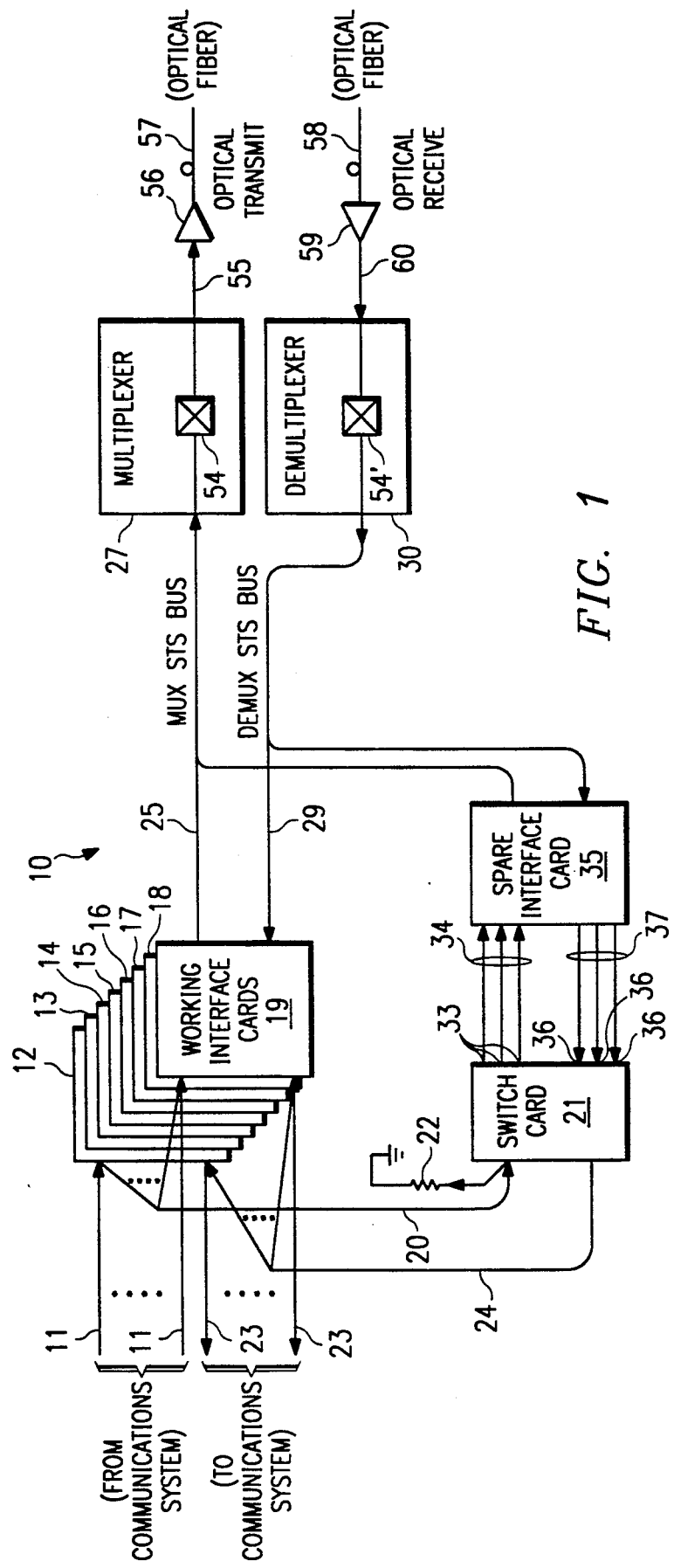
FIG. 1 is a high level schematic diagram of a DS3/optical communications interface which may incorporate the invention.

In FIG. 1, an electro-optical telecommunications interface circuit is shown which may advantageously incorporate the invention. The interface circuit or system is indicated generally at 10.

An incoming electronic communication line 11 includes, in the illustrated embodiment, twenty-four DS3 communication channels. The incoming line 11 is connected to respective input ports or working card ports (described below) of a plurality of working interface cards 12–19. In the illustrated embodiment, three DS3 channels are connected to each of the eight cards 12–19. A transmission line 20, which for example may be constituted by 75-Ohm microstrip, connects the input ports of the working interface cards 12–19 with respective working circuit ports (described below) of a switch card 21. The working card ports of the switch card 21 are, in the embodiment shown in FIG. 1, connected to respective groups of termination resistors 22, one resistor per channel.

There is also an outgoing electronic communications line 23 having 24 DS3 channels. Groups of three of these DS3 channels are connected to respective ports (described below) of the working interface cards 12–19. A twenty-four channel transmission line 24, which for example may consist of 75-Ohm microstrip, is connected between each of the outputs of the working interface cards 12–19 and respective working circuit output ports (described below) of the switch card 21.

The signals received on the incoming transmission line 11 are processed by the working interface cards 19 and put onto a digital bus 25. Bus 25 is connected to a multiplexer or formatter 27. A digital bus 29 is connected between the working interface cards 12–19 and a demultiplexer or deformatter 30. Digital bus 29 communicates deformatted STS digital information from the demultiplexer 30 to the working interface cards 12–19, which in turn transmit information in a DS3 format onto the outgoing DS3 line 23.

The switch card 21 includes a plurality of spare circuit or spare card ports 33 which are connected by a three-channel transmission line 34 to respective inputs (described below) of a spare interface card 35. The spare interface card 35 has outputs (described below) connected to respective spare circuit ports 36 of the switch card 21 through a three-channel transmission line 37. The spare card 35 is connected to STS digital buses 25 and 29.

Multiplexer 27 and demultiplexer 30 includes cross point matrix circuits 54 and 54'. The cross point matrix 54 is connected through a data path 55 (including further circuitry, not shown) to an electronic signal input of an optical transmission circuit 56. Optical signals are transmitted from an optical output of the optical transmission circuit 56 on an optical fiber 57. Another fiber 58 is terminated by an optical input of an optical receiving circuit 59. An electrical signal output of optical receiver circuit 59 is connected by a data path 60 to the demultiplexer 30.

The illustrated interface circuit 10 multiplexes up to twenty-four DS3 inputs 11 into a 1.2 Gigabit fiber optic signal sent out on line 57, and demultiplexes a 1.2 Gigabit optical signal on fiber 58 into up to twenty-four DS3 communication channels 23.

Figure 2:
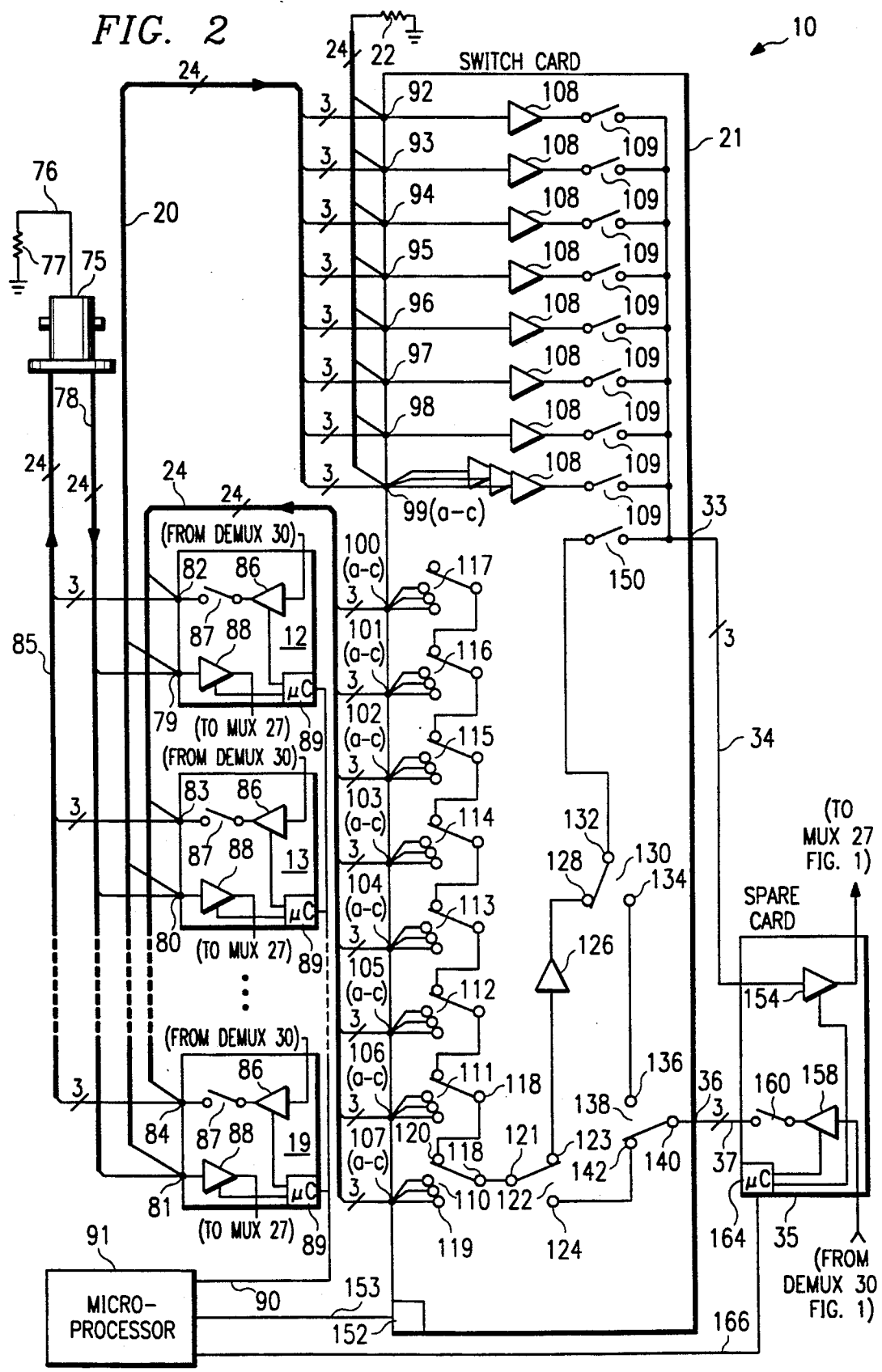
FIG. 2 is a more detailed schematic block diagram of a portion of high-speed telecommunications interface circuit shown in FIG. 1, illustrating the spare card and monitoring circuitry of the invention.

FIG. 2 is a high level electrical schematic diagram of the high-speed telecommunications interface 35 circuit 10 employing the invention. The invention is described in conjunction with a 1-for-8 spare card/working card protection scheme, in which three DS3 transmitter and receiver circuits reside on each of the working interface cards 12–19. Other protection schemes may also employ the invention, as in m-for-n protection schemes. The invention also has application to DS1, DS2 and STS communications circuits, and any other electronic communication protocol having a bit rate of less than about 52 Megahertz.

A backplane connector is shown at 75. Connector 75 is representative of forty-eight different backplane connectors which connect to respective 75-Ohm coaxial transmission lines external to the equipment. These lines are indicated schematically by the transmission line 76. The output channels of the coaxial transmission lines 76 are each terminated at their further ends by termination resistors, herein symbolically indicated by the single resistor 77. The backplane connectors 75 are connected on the input side to a 75-Ohm microstrip incoming line 78 which includes twenty-four DS3 communication line pairs or channels. Groups of three channels of the DS3 input line 78 are connected to input ports 79, 80, ... 81 of the working transmitter/receiver interface cards 12, 13, ... 19. In the illustrated embodiment, there are eight such working interface cards, although the number may be varied according to the particular requirements of the telecommunications interface circuit.

Each of the DS3 interface cards 12, 13, ... 19 has a respective output port 82, 83, ... 84 connected to three respective channels of a twenty-four channel microstrip outgoing line 85. Outgoing data transmission line 85 is connected to a set of twenty-four backplane connectors, once again represented schematically by connector 75 in FIG. 2.

Each of the working interface cards 12, 13, ... 19 includes a set of three DS3 transmitter circuits, each set indicated by a single high-impedance output buffer 86, a set of three relays each shown by a single relay or switch 87, which relays 87 selectively connect the outputs of the transmitter circuits 86 to the respective output port 82, 83, ... or 84, and a set of three DS3 receiver circuits, which set is shown by a single high input impedance amplifier 88. The transmitter circuits 86 each include a high-impedance output buffer, a digital-to-analog conversion circuit and line buildout circuitry (not shown). Each of the DS3 receiver circuits 88 includes a high input impedance amplifier and analog-to-digital conversion circuitry (not shown). An on-board microcontroller 89 is provided on each interface card 12, 13, ... 19 to sense the operational state of the respective interface card 12, 13, ... 19, to (with associated circuitry, not shown) sense the signal quality of the signals transmitted by receiver 88 and transmitter 86, and to actuate the switches 87 on the respective card. Each of the on-board microcontrollers 89 is connected by appropriate control lines, here represented by control line 90, to a central microprocessor 91 which controls the switching in the interface circuit 10.

The input ports 79, 80, ... 81 are connected by a twenty-four channel microstrip data transmission line 20 to a respective one of a set of working circuit input ports 92, 93, ... 99 of the switch card 21. Card 21 has three input switching circuits and three output switching circuits, with all three of the input and output switching circuits being represented by a single set of devices in FIG. 2. Output ports 82, 83, ... 84 of the working interface cards 12, 13, ... 19 are connected by a twenty-four channel microstrip transmission line 24 to respective ones of a set of working circuit output ports 100, 101, ... 107 of the switch card 21. Each of the ports 92–99 and ports 100–107 on the switch card actually represent three communication channels apiece; each of the switches and amplifiers shown in switch card 21 also represent three devices or circuits.

The working circuit ports 92–99 on switch card 21 are connected to the twenty-four resistor resistive termination block 22. The value for each resistor inside block 22 is preferably chosen to be about 68o. The difference between this value and the characteristic impedance of line 20 is accounted for by the capacitive loading of switch card 21 itself. The resistive termination block 22 is connected to the back of the connector associated with the switch card 21, and may be of the type manufactured by 3M Manufacturing Company under part No. 80-6105-1409. AMP makes a similar resistive termination block.

The working card ports 92–99 of switching card 21 are connected to inputs of respective high input impedance amplifiers 108 which effectively terminate the twenty-four channel transmission line 20. The outputs of the high input impedance amplifiers 108 are connected through respective, normally open switches or relays 109 to the three-channel spare card port 33 of the switch card 21.

Each of the ports 100-107 of the switch card 21 is provided with a respective three-terminal, two-position switch 110, 111, 112, . . . 117. As is particularly shown for switch 110, each of the switches 110-117 has three terminals: an input terminal 118, an external output terminal 119, and a series connection terminal 120. The series connection terminal 120 of any of the switches 110-117 is connected to the input terminal 118 of the next switch 111, 112, . . . or 117. The input terminal 118 of the first switch 110 is connected to a terminal 121 of a switch 122. The switch 122 has terminals 123 and 124, one of which may be connected to the terminal 121 at any one time.

An input of a high input impedance amplifier 126 is connected to the switch terminal 123. The output of the high impedance amplifier 126 is connected to a terminal 128 of a switch 130. A terminal 132 of the switch 130 may be connected to one of terminals 128 and 134 thereof. Terminal 134 of the switch 130 is connected to a terminal 136 of a switch 138, which also has terminals 140 and 142. The terminal 142 of the switch 138 is connected to terminal 124 of switch 122. Terminal 140 of the switch or relay 138 is connected to a selected one of the terminals 136 and 142 thereof. Terminal 140 of the switch 138 serves as the spare card output port 36 of the switch card 21. Terminal 132 of the switch 130 is connected through a switch 150 to the spare card port 33 of the switch card 21.

An on-board logic decoding circuit 152 is connected to sense the states of the various switches on switch card 21, and assists microprocessor 91 in creating a data path from any one working circuit input port 92-99 to spare circuit port 33, or a data path from any one working circuit port 100-107 to spare circuit port 36, or alternatively a data path from spare circuit port 33 to spare circuit port 33, as will be hereinafter further explained. Logic decoding circuit 152 is connected by at least one control line 153 to central microprocessor 91.

The spare card 35 may be substantially identical to the working interface cards 12, 13, . . . 19. The spare card 35 includes three DS3 receiver circuits, symbolically indicated on the spare card 35 by the high input impedance amplifier 154. Inputs of the DS3 receiver circuits 154 are connected by the three-channel line 34 to port 33 of the switch card 21. The spare card 35 also includes three DS3 transmitter circuits 158, here represented by a single high impedance output buffer. The outputs of the DS3 transmission circuits 158 are connected through a set of three normally open switches 160 to the three-channel communication path 37 to spare card output terminal 36 on the switch card 21.

An on-board microcontroller 164, which for example may be a 60HC11, is operable (with associated circuitry, not shown) to sense the operational state of the spare card 35, and to sense the qualities of the signals being processed by the card. Microcontroller 164 is controlled by central microprocessor 91 by appropriate control lines, herein indicated schematically by control line 166.

The protection scheme shown in FIG. 2 allows the removal of any one of the working interface cards 12, 13, . . . 19, and its replacement by spare card 35, without disturbance of the signal paths for the remaining working cards. On the input side of the circuit 10, the positioning of the resistive termination block 22 at the working card ports 92-99 of the switch card 21 vitiates the data distortion problem that would otherwise occur because of the existence of a transmission line stub formed by the data path 20. The resistive termination block 22 obviates the necessity of termination resistors and associated relay switches on each of the working interface cards 12, 13, . . . 19 and spare card 35.

On the output side of the circuit 10, a ladder or series connection arrangement of switches 110-117 is used to solve two problems associated with the more conventional switching arrangement (not shown) in which three tiers of binary switches are used to select one of $2^3$ sets of channels. In both output connection schemes, the working card ports 100-107 of the switch card 21 are connected with respective ports 82, 83, . . . 84 of the working interface cards 12, 13, . . . 19. When the working interface cards are in normal operation, each of their ports 82, 83, . . . 84 is connected to a relatively short transmission line stub formed by one of the channels in connecting link 24. In the output switching arrangement shown in FIG. 2, the transmission stub lengths stay the same length. In the old switching matrix, the transmission lines stub lengths could change length, and further could suffer "hits" to the data in other channels because of switching at the end of those lengths. The series or ladder arrangement of switches 110-117 removes this problem because only one of the external output terminals 119 is connected, and the switching paths of the remaining channels are not touched.

Connections to the receiving circuits 88 on each of the working interface cards 12-19 should be less than one inch long and should have a capacitance of less than five picofarads. Connections to each of the high-impedance amplifiers 108 on switch card 21 should be less than about two inches long and should have a capacitance of less than about five picofarads. However, the connection 34 between the switch card 21 and the spare card 35 can be relatively long, such as several feet, because the input transmission line 20 is effectively terminated by the high-impedance amplifiers 108. Each of the switches illustrated in FIG. 2 may be conventional telecommunication relays, or may also be semiconductor devices such as pin diodes. The switches should close within a period of three to four milliseconds, and have a Z(on) of less than and equal to one to two Obans.

The working interface cards 12, 13, . . . 19, as using conventional components, actually have a relatively high reliability; therefore, the switch card 21 and the spare card 35 are not used often for protection. This makes the switch card 21 and the spare card 35 available for monitoring functions, as will be detailed immediately below.

Figure 3A:
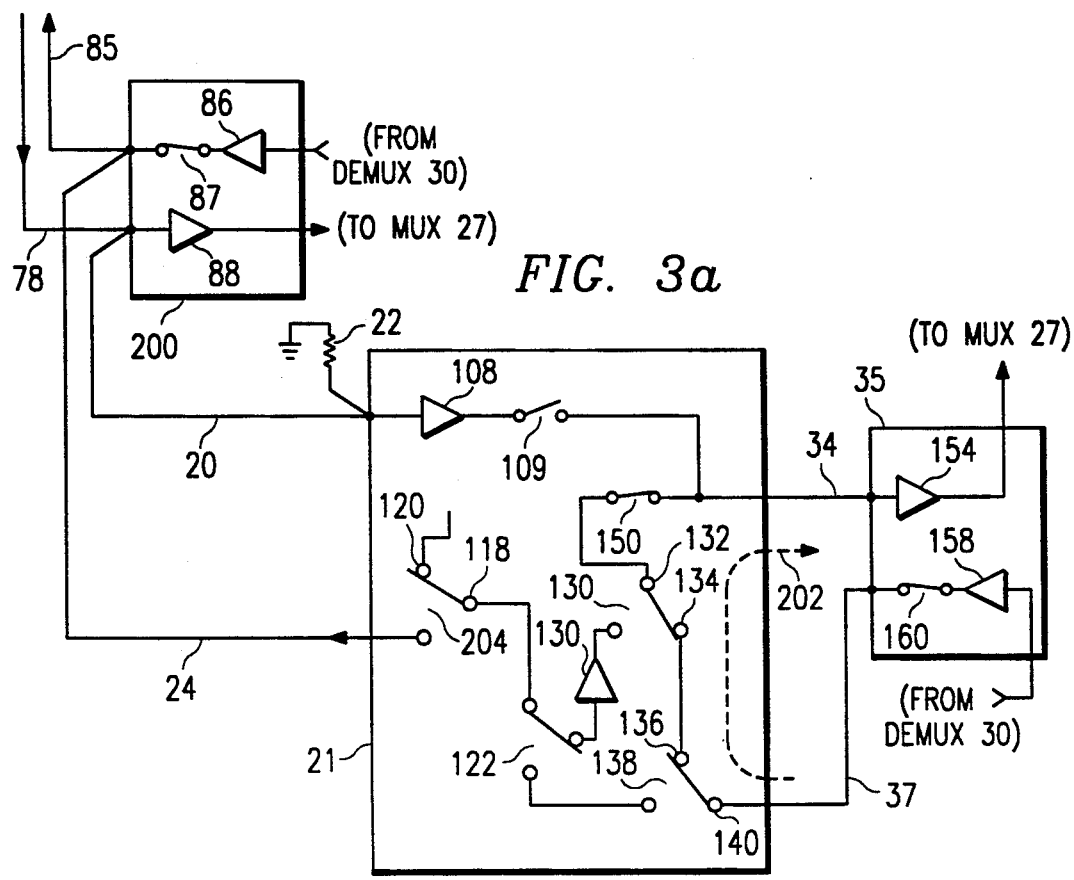
FIGS. 3a–3e are simplified electrical schematic diagrams showing various operational modes of the high-speed telecommunications interface circuit of FIGS. 1 and 2, with only relevant components shown.

FIGS. 3a-3e are simplified electrical schematic diagrams of the high-speed telecommunications interface circuit of FIG. 2, with only relevant components shown. FIG. 3a illustrates operation of the protection and interface circuit in a normal operation/switch card test mode. A representative one of the working interface cards 12-19 is shown at 200. In this mode, switch or relay 87 on the working card 200 is closed, such that data transmission and reception occurs using circuits 86 and 88, respectively. Terminals 136 and 140 of switch 138 are closed, as are terminals 132 and 134 of switch 130. Switch 150 is closed, while switch 109 is open.

This creates a data loop or path 202 from the transmitter circuit 158 of the spare card 35 to the receiver circuit 154 thereof. The spare card receiver circuit 154 may be used to test the continuity of the devices within the loop 202 on the switch card 21. An output switch 204, which is one of the series-connected switches 110–117 (FIG. 2), corresponds to the working interface card 200, and is resident on the switch card 21. Switch 204 is switched such that its input terminal 118 and its series connection terminal 120 are connected together.

Figure 3B:
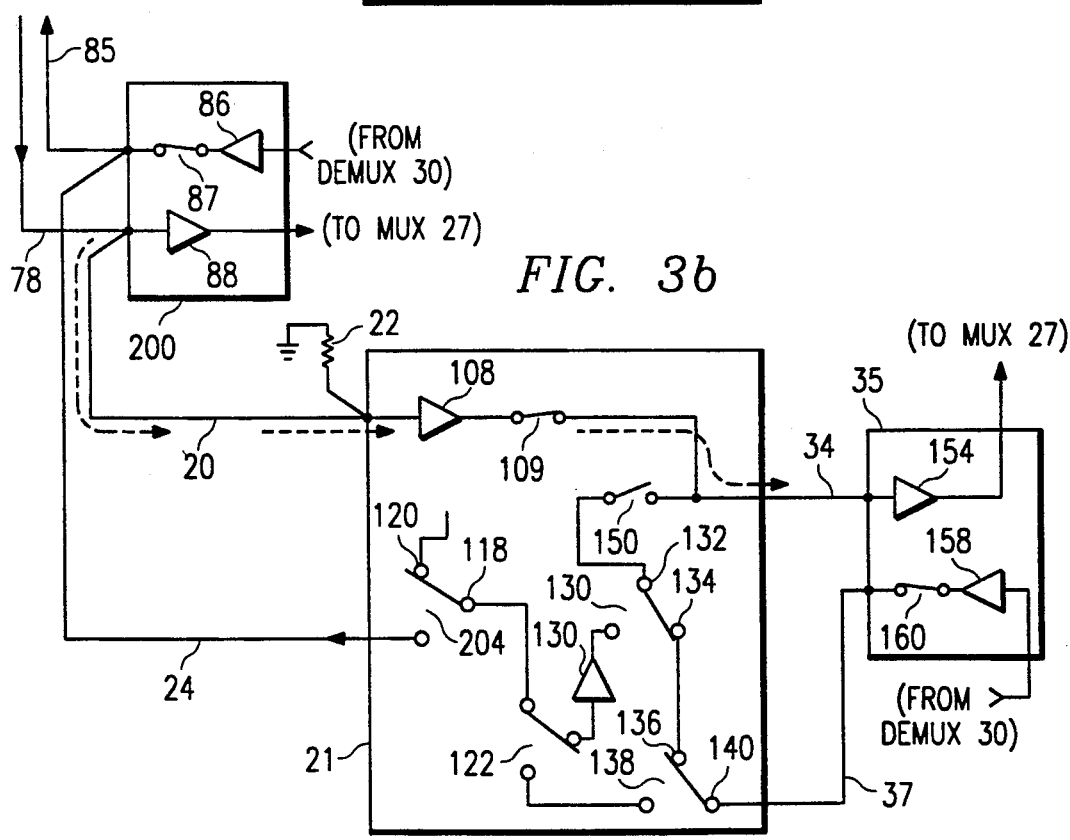

FIG. 3b illustrates switch positions of the cards in a normal operation/working card input monitor mode. A switch 109 is selected which corresponds to a selected one of the working cards 200. This switch 109 is closed while the remaining corresponding switches (not shown in FIG. 3b) are left open. Switch 150 is opened. This creates a path for the reception of an incoming signal along line 20, through high input impedance amplifier 108, through closed switch 109, on to conductor 34, and to the input of the high impedance amplifier 154 on the spare card 35. This signal path is shown by the arrows. In this mode, the signal received by the selected working card 200 is bridged to the input of the receiver 154 on the spare card 35, without affecting or "hitting" the received signal on incoming line 78 or at the input of the amplifier 88. This is because the incoming transmission line is effectively terminated by resistive block 22 and by the high input impedance of the amplifier 108. Groups of three of the twenty four incoming signals on line 78 thus may be bridged onto the inputs of the spare card 35.

Since the impedance matching is so arranged that the signal received at the input of amplifier 154 is no better than that received at the input of amplifier 88, a comparison may be made between the quality of the signals. If it turns out that the quality of the signal is better at the input of receiver 154 on spare card 35 than it is at the input of receiver 88 on the working card 200, the system will know that there is a malfunction on the working card 200. In this instance, the selected switch 109 will stay closed and the receiver 154 of the spare card 35 will be effectively substituted for the receiver 88 of the working card 200. However, if the signal received at receiver 154 is only as good as or worse than the received signal at receiver 88, the system will know that there is no malfunction or that the malfunction lies outside of the equipment, and therefore should not be protected. The working cards 200 may be tested in a continuous succession until a malfunction is discovered.

Figure 3C:
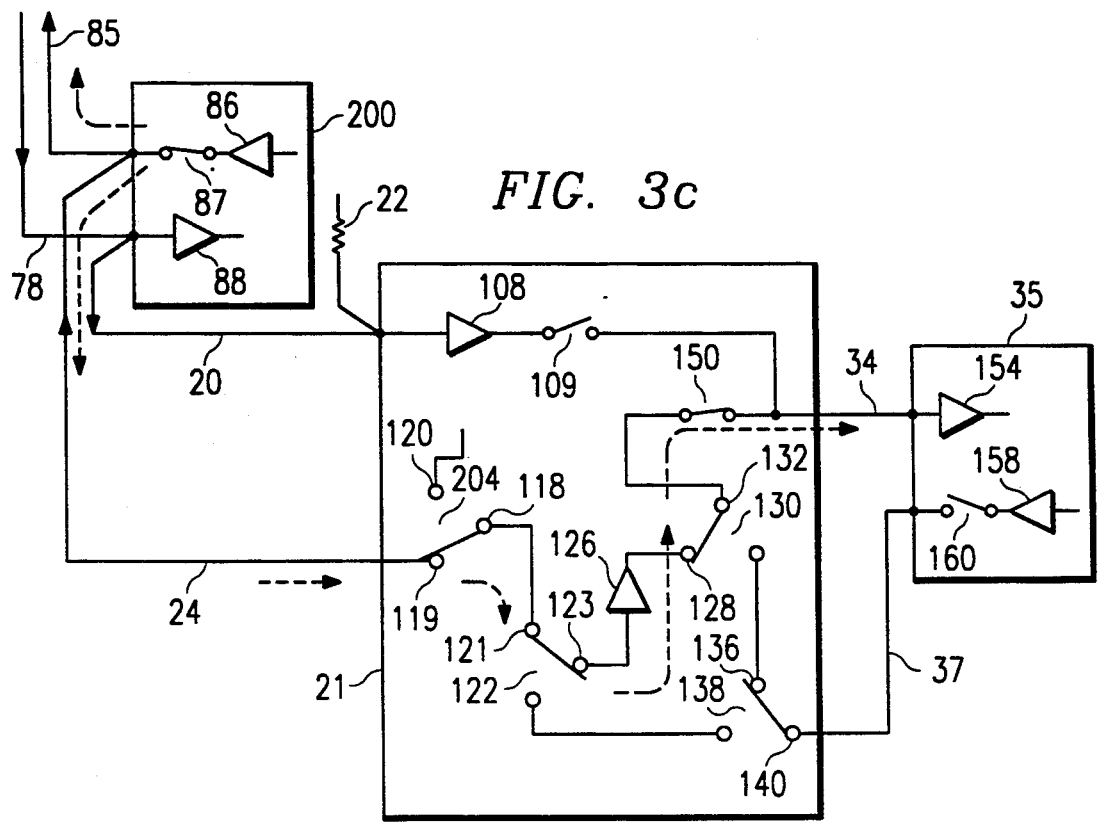

FIG. 3c illustrates switch positions of the cards in a normal operation/working card output monitor mode. In this mode, transmitter and receiver circuits 86 and 88 on the representative working interface card 200 transmit and receive data in a normal fashion. Switch 204 on the switch card 21 is closed between its terminals 119 and 118. Switch 122 is closed between its terminals 121 and 123. Switch 130 is closed between terminals 128 and 132, while switch 150 is closed. Switch 109 is opened. This creates a second, bridging data communication path along transmission line 24, through switches 204 and 122, through high input impedance amplifier 126, through switches 130 and 150, through communication line 34 and finally, to receiver 154 on the spare card 35. In this way, the data from the transmitter circuit 86 on any one of the working cards 12–19 may be monitored by the spare card 35. By actuating a selected one of the switches 110–117 (FIG. 2), transmitter circuits 86 on each of the working interface cards 12–19 may be cyclically tested. The interface circuit therefore can acquire information as to whether a system fault is due to a fault of any of the working interface cards 12–19, or whether such a communication fault lies external to the equipment.

Figure 3D:
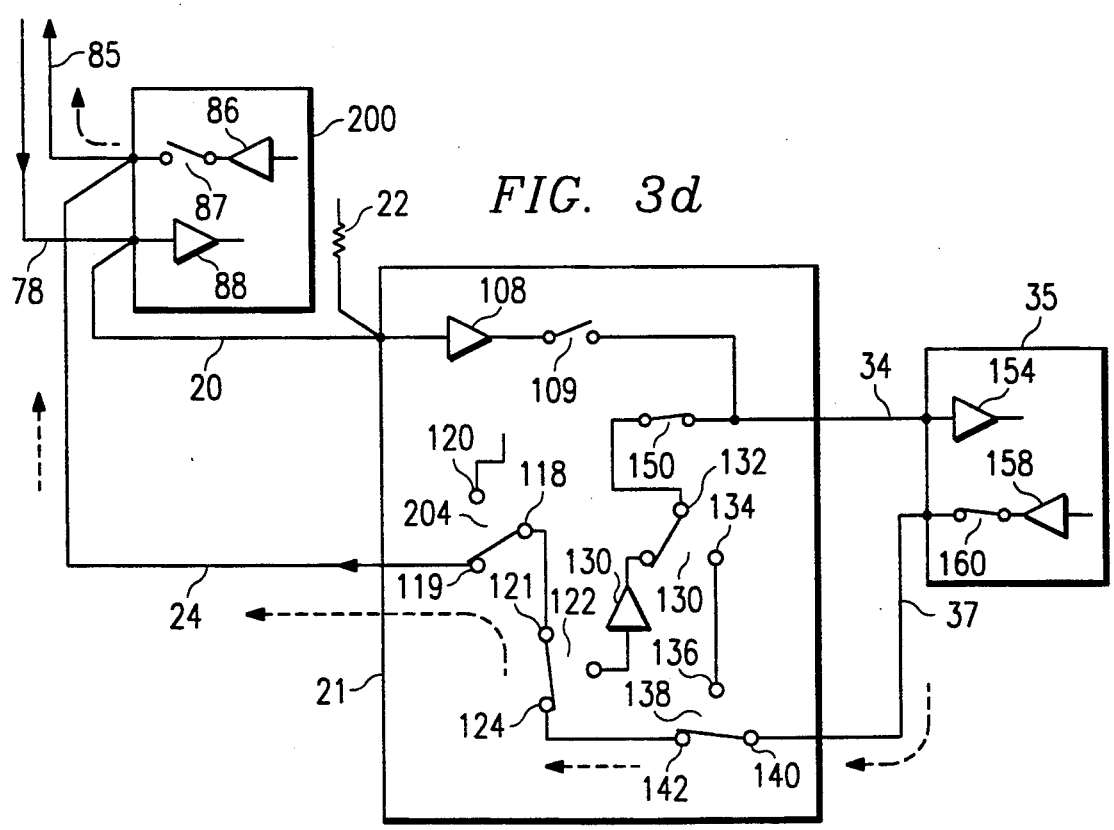

FIG. 3d illustrates the configuration of the system in an output protection mode with normal operation of the input. On the input side, switch 109 is left open. Therefore, the transmission line 20 is terminated by resistive termination 22, and the data are received by receiver 88 on the representative working interface card 200. On the output side, in response to sensing a fault, the switch or relay 87 is opened on the working interface card 200, and switch 160 is closed on the spare card 35. Switch 138 is closed between terminals 140 and 142, switch 122 is closed between terminals 121 and 124, and switch 204 is closed between terminals 118 and 119. This creates a data path including line 37, switches 138, 122 and 204, line 24, and outgoing couununication line 85.

Figure 3E:
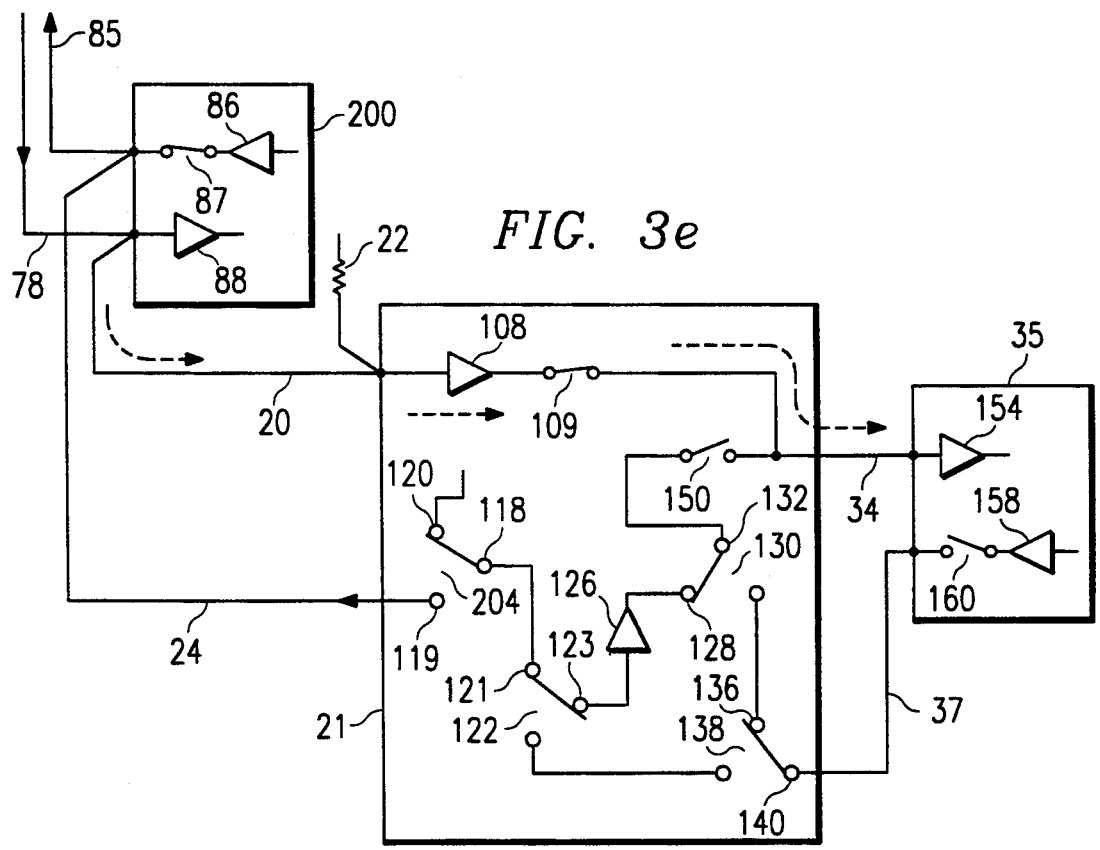

FIG. 3e illustrates the configuration of the system in an input protection mode with normal output operation. On the output side, switch 204, corresponding to the representative interface card 200, is closed between its terminals 118 and 120, effectively disconnecting the remainder of the output protection circuitry from the outgoing data line 85. Data continue to be transmitted from the transmitter circuit 86 through the closed switch or relay 87 onto the output line 85. On the input side, switch 109 is closed, while switch 150 is opened. This creates a data path from input line 78, onto input line 20, through high-impedance buffer 108 and switch 109, and onto line 34 to be received by the receiving circuit 154 on the spare card 35.

While normal output/protection input and normal input/protection output modes have been shown in FIGS. 3d and 3e, a protection output/protection input mode is also possible for the complete substitution for a malfunctioning surface card 12–19. For such a mode, the protection positions of the switches of both the input side (FIG. 3d) and the output side (FIG. 3e) would be combined.

In summary, the present invention allows monitoring and testing of the switch card 35 and each of the working interface cards 12–19 (FIG. 2) in a way that does not interfere with the normal operation of the working cards. This increases the reliability and therefore the availability of the interface circuit. By bridging onto the incoming signal instead of switching it, the working card input monitor mode eliminates unnecessary switching events and makes the interface equipment quantifiably more reliable to customers, as less switching events are counted. The present monitor mode also allows checking the integrity of the output signal without the very elaborate circuitry that would otherwise be required.

While preferred embodiments of the invention and their advantages are shown, the present invention is not limited thereto but only by the scope and spirit of the appended claims.

What is claimed is:

1. In communications interface circuitry, switching and monitoring circuitry comprising:

a plurality of working interface circuits each having at least one transmitter and at least one receiver;

a spare interface circuit having at least one transmitter and at least one receiver; and a switch circuit coupled to said working interface circuits and said spare interface circuit, said switch circuit including a plurality of switches, said switches operable to create a selected one of the following data paths;

a first data path from a selected one of the working interface circuits to the spare interface circuit;

a second data path from a malfunctioning one of the working interface circuits to the spare interface circuit; and a third data path from the spare interface circuit through the switch circuit to the spare interface circuit;

said first data path operable to monitor the operation of the selected one of the working interface circuits;

said second data path operable to substitute at least a portion of the spare interface circuit for a like portion of the malfunctioning one of the working interface circuits; and said third path operable to monitor the operation of the switch circuit.

2. A method for protecting a telecommunications interface circuit having a plurality of working interface circuits, at least one spare interface circuit and a switching circuit having a plurality of first terminals, a plurality of second terminals, at least one third terminal and at least one fourth terminal, comprising the steps of:

in a normal operation mode, for each of said working interface circuits, closing a working transmitter switch to connect a working transmitter circuit of said working interface circuit to an output communications path;

in said normal operation mode, for each of said working interface circuits, opening a respective input switch in the switching circuit to isolate the switching circuit and the spare interface circuit from the working interface circuits;

in said normal operation mode, when it is desired to test circuitry of the switching circuit, closing a data path loop in the switching circuit between said third and fourth terminals of the switching circuit to connect the output of the spare interface circuit to the input of the spare interface circuit;

in said normal operation mode, when it is desired to test a transmitter circuit of a selected one of said working interface circuits, creating a data path in the switching circuit from a selected second terminal of the switching circuit corresponding to the selected one of the working interface circuits to the third terminal of the switching circuit, to thereby connect an output terminal of the selected working interface circuit to the input terminal of the spare interface circuit;

in an output protection mode, performing the following substeps;

opening a transmitter switch in a malfunctioning working interface circuit to disconnect the transmitter circuit of the malfunctioning interface circuit from an outgoing transmission line;

closing a transmitter switch in the spare interface circuit;

creating a data path in the switching circuit from the fourth terminal thereof to a selected second terminal thereof;

responsive to the last said substeps of closing and creating, connecting a transmitter circuit of the spare interface circuit to said outgoing transmission line; and in an input protection mode, performing the following substeps;

creating a data path from a selected first terminal of the switching circuit to the third terminal of the switching circuit, where the selected first terminal is connected to an input terminal of a malfunctioning working interface circuit; and using a high impedance amplifier in the last said data path to terminate a transmission line associated with the malfunctioning working interface circuit.

3. The circuitry of claim 2, and further including the step of, during the normal operation mode, resistively terminating an incoming transmission line at each first terminal of the switching circuit.

4. Switching and monitoring circuitry for use in an electronic communications interface, comprising:

a plurality of working interface circuits each having at least one transmitter and at least one receiver;

a spare interface circuit having at least one transmitter and at least one receiver; and a switch circuit coupled to said working interface circuits and said spare interface circuit, said switch circuit including a plurality of switches, said switches operable to create a selected one of at least the following data paths:

a first data path from a selected one of the working interface circuits to the spare interface circuit; and a second data path from a malfunctioning one of the working interface circuits to the spare interface circuit;

said first data path operable to monitor the operation of the selected one of the working interface circuits without affecting any communications signal transmitted by said selected one of said working interface circuits; and said second data path operable to substitute at least a portion of the spare interface circuit for a like portion of the malfunctioning one of the working interface circuit.

5. Circuitry for switching between a plurality of telecommunications interface circuits, comprising:

a plurality of working circuits each having a transmitter circuit, a receiver circuit, an input terminal connected to the receiver circuit, and an output terminal coupled to the transmitter circuit, an incoming telecommunication line including a plurality of incoming channels connected to respective ones of said input terminals of said working circuits, an outgoing telecommunication line including a plurality of outgoing channels connected to respective ones of said output terminals of said working circuits;

a switching circuit having a plurality of first terminals, a plurality of second terminals, at least one third terminal and at least one fourth terminal, said input terminals of said working circuits connected to respective first terminals of said switching circuit, said output terminals of said working circuits connected to respective second terminals of said switching circuit;

at least one spare circuit having a transmitter circuit, a receiver circuit, an input terminal, an output terminal, and a transmitter switch operable to connect said transmitter circuit of said spare circuit to said output terminal thereof, said fourth terminal of said switching circuit connected to said output terminal of said spare circuit, said third terminal of said switching circuit connected to said input terminal of said spare circuit; and a working card test mode data path of said switching circuit operable to connect a selected one of said second terminals to said third terminal.

6. The circuitry of claim 5, wherein each of said working circuits further includes a transmitter switch operable to connect the transmitter circuit thereof to the output terminal thereof.

7. Circuitry for switching between a plurality of telecommunications interface circuits, comprising:
a plurality of working circuits each having a transmitter circuit, a receiver circuit, an input terminal connected to the receiver circuit, an output terminal coupled to the transmitter circuit, an incoming telecommunication line including a plurality of incoming channels connected to respective ones of said input terminals of said working circuits, an outgoing telecommunication line including a plurality of outgoing channels connected to respective ones of said output terminals of said working circuits;
a switching circuit having a plurality of first terminals, a plurality of second terminals, at least one third terminal and at least one fourth terminal, said input terminals of said working circuits connected to respective first terminals of said switching circuit, said output terminals of said working circuits connected to respective ones of said second terminals of said switching circuit;
at least one spare circuit having a transmitter circuit, a receiver circuit, an input terminal, and output terminal, and a transmitter switch operable to connect said transmitter circuit of said spare circuit to said output terminal thereof, said fourth terminal of said switching circuit connected to said output terminal of said spare circuit, said third terminal of said switching circuit connected to said input terminal of said spare circuit; and
a switching circuit test mode data path of said switching circuit operable to connect said fourth terminal of said switching to said third terminal thereof.

8. The circuitry of claim 7, wherein each of said working circuits further includes a transmitter switch operable to connect the transmitter circuit thereof to the output terminal thereof.

9. Switching and monitoring circuitry for use in an electronic communications interface, comprising:
a plurality of working interface circuits each having at least one transmitter and at least one receiver;
a spare interface circuit having at least one transmitter and at least one receiver; and
a switch circuit coupled to said working interface circuits and said spare interface circuit, said switch circuit including a plurality of switches, said switches operable to create a selected one of at least the following data paths;
a first data path from the spare interface circuit through the switch circuit to the spare interface circuit; and
a second data path from a malfunctioning one of the working interface circuits to the spare interface circuit;
said first data path operable such that the spare interface circuit may be used to monitor the operation of the switch circuit; and
said second data path operable to substitute at least a portion of the spare interface circuit for a like portion of the malfunctioning one of the working interface circuits.

10. Switching and monitoring circuitry for use in an electronic communications interface, comprising:
a plurality of working interface circuits each having at least one transmitter with an output and at least one receiver;
a spare interface circuit having at least one transmitter with an output and at least one receiver; and
a switch circuit coupled to said working interface circuits and said spare interface circuit, said switch circuit including a plurality of switches, said switches operable to create a selected one of at least the following data paths;
a first data path from said transmitter of a selected one of said working interface circuits to said receiver of said spare interface circuit; and
a second data path from said output of said transmitter on a malfunctioning one of said working interface circuits to said output of said transmitter on said spare interface circuit;
said first data path operable such that said receiver on said spare interface circuit may be used to monitor the operation of said transmitter of said selected one of said working interface circuits; and
said second data path operable such that said transmitter of said spare interface circuit is substituted for said transmitter of said malfunctioning one of said working interface circuits.

* * * * *

UNITED STATES PATENT AND TRADEMARK OFFICE
CERTIFICATE OF CORRECTION

PATENT NO. : 5,321,393

DATED : June 14, 1994

INVENTOR(S) : Carlton, et al.

It is certified that error appears in the above-identified patent and that said Letters Patent is hereby corrected as shown below:

Column 1, line 27, after "these", delete "connectors", and insert -- connects --.

Column 4, line 57, after "about 68", delete "0" and insert -- $\Omega$ --.

Column 4, line 59, after "is", insert -- at least partially --.

Column 5, line 41, after "circuit port", delete "33", and insert -- 36 --.

Column 6, line 49, after "two", delete "obans", and insert -- Ohms --.

Column 8, line 18, after "122", delete "25";

Column 8, line 43, after "switch card", delete "35", and insert -- 21 --.

Column 9, line 3, after "data paths", delete ";", and insert -- : --;

Column 9, line 19, after "said third", insert -- data --.

Column 9, line 54, after "substeps", delete ";", and insert -- : --.

Column 10, line 25, after "interface" second occurrence, delete "circuit" and insert -- circuits --.

UNITED STATES PATENT AND TRADEMARK OFFICE
CERTIFICATE OF CORRECTION

PATENT NO. : 5,321,393
DATED : June 14, 1994
INVENTOR(S) : Carlton, et al.

It is certified that error appears in the above-identified patent and that said Letters Patent is hereby corrected as shown below:

Column 11, line 41, after "switching", insert -- circuit --.

Signed and Sealed this

First Day of August, 1995

Attest:

*Attesting Officer*

BRUCE LEHMAN
*Commissioner of Patents and Trademarks*